Patented June 4, 1929.

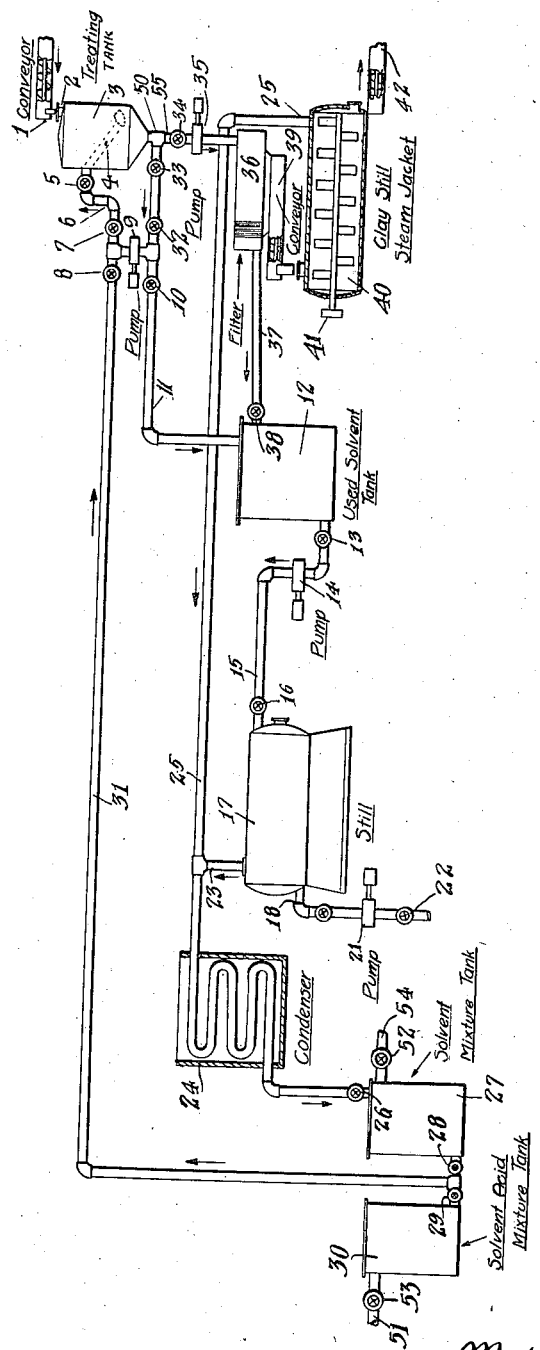

1,715,535

UNITED STATES PATENT OFFICE.

MARVIN L. CHAPPELL, OF LOS ANGELES, CALIFORNIA, ASSIGNOR, BY MESNE ASSIGN-
MENTS, TO CONTACT FILTRATION COMPANY, OF SAN FRANCISCO, CALIFORNIA, A
CORPORATION OF DELAWARE.

PROCESS OF REVIVIFYING SPENT CLARIFYING AND DECOLORIZING AGENTS.

Application filed March 24, 1926. Serial No. 97,067.

This invention relates to the revivification of spent clarifying and decolorizing agents which have been used for the clarifying and decolorizing of petroleum oils, and is particularly directed to those classes of decolorizing and clarifying agents which, as their basic ingredient, include hydrous aluminum silicate in a ratio of less than 1 part of alumina ($Al_2O_3$) to 4 parts of silica ($SiO_2$) such, for example, as the artificially produced clarifying and decolorizing agents derived from the acid treatment of a Montmorillonite type of clay, in accordance with the process of the copending application of Marvin L. Chappell, Richard F. Davis, and Merle M. Moore, filed August 1, 1921, Serial No. 488,952.

An object of the present invention is to provide a method which is adapted not only to completely revivify spent clarifying and decolorizing agents of the above type, but also to obtain an added decolorizing efficiency of from 1 to as high as 15 per cent higher, thereby forming an agent having a clarifying and decolorizing efficiency range from 101 to as high as 115 per cent as compared with the agent before use.

More specifically, I have discovered that clarifying and decolorizing agents which comprise as their basic ingredient hydrous aluminum silicate can be most effectively revivified by the use of a color solvent containing sulfuric acid provided that the quantity of sulfuric acid employed upon the agent is within certain limits hereinafter set forth. The clarifying and decolorizing agents to be treated by this process belong to the class of hydrous aluminum silicate which, before acid treatment, have substantially no natural clarifying and decolorizing properties, that is, which could not be commercially profitably employed for such purposes. Such clays before being converted into a clarifying and decolorizing agent by an acid treatment, are silicates of aluminum of the Montmorillonite type and of the approximate formula $H_2Al_2Si_4O_{12}N(H_2O)$.

As a specific example, the following is an analysis of a typical Montmorillonite clay before and after being converted into a decolorizing agent by a clarifying treatment:

Clay from Otay, San Diego County, California. Air dried.

|  | Per cent. |
|---|---|
| Water at 105° C., $H_2O$ | 13.55 |
| Water over 105° C., $H_2O$ | 5.77 |
| Silica, $SiO_2$ | 54.56 |
| Alumina, $Al_2O_3$ | 18.61 |
| Iron oxide, $Fe_2O_3$ | 1.83 |
| Calcium oxide, CaO | 1.10 |
| Magnesium oxide, MgO | 4.10 |
| Potassium oxide, $K_2O$ | 0.09 |
| Titanium oxide, $TiO_2$ | 0.016 |
| Sodium oxide, $Na_2O$ | 1.04 |
|  | 100.666 |

After treatment with sulfuric acid at the rate of 600 pounds per ton of air-dried clay, according to the copending application of Marvin L. Chappell, Richard F. Davis, and Merle M. Moore, filed August 1, 1921, Serial No. 488,952:

|  | Per cent. |
|---|---|
| Loss on ignition, $H_2O$ | 20.6 |
| Silica, $SiO_2$ | 61.0 |
| Alumina, $Al_2O_3$ | 15.0 |
| Magnesium oxide, MgO | 2.9 |
| Calcium oxide, CaO | .5 |
|  | 100.0 |

Such clarifying and decolorizing agents when employed to clarify and improve the color of petroleum oil in accordance with the process described in United States Letters Patent Nos. 1,404,374 and 1,404,375, granted to Marvin L. Chappell and Merle M. Moore, or employed in any other preferred manner for the decolorizing and clarifying of petroleum oil, may be revivified by the process of this invention.

The process of the present invention is also adapted for the treatment of spent clarifying and decolorizing agents which are known as Ventura or Utah clays, such clays having the following analysis:

|  | Per cent. |
|---|---|
| Loss on ignition, $H_2O$ | 7.00 |
| Silica, $SiO_2$ | 67.60 |
| Alumina, $Al_2O_3$ | 20.20 |
| Iron oxide, $Fe_2O_3$ | 2.00 |
| Calcium oxide, $CaO$ | 2.30 |
| Magnesium oxide, $MgO$ | 1.20 |
|  | 100.30 |

In the process of the present invention, I employ an organic solvent containing a water solution of sulfuric acid of such strength that the sulfuric acid will not react on the organic solvent. The organic solvent to be employed may contain either an alcohol or ketone, or a mixture of alcohols and ketones. For example, acetone, methyl-ethyl ketone, ethyl ketone, or ethyl propyl ketone may be employed, of which acetone, for commercial reasons, is preferred. Also methyl, ethyl, propyl or butyl alcohol may be employed. To the color solvent is preferably added a solvent suitable to dissolve such mineral oil as may be left in the clarifying and decolorizing agent. Such oil solvent may be a hydrocarbon derived from petroleum oil or an organic hydrocarbon such as benzol, toluol, xylol, or mixtures of any such or like mineral oil solvents.

As an example of the organic solvents which are to be employed in the process, I have employed the following admixtures by volume: (1) gasoline, 60 parts, ethyl alcohol, 30 parts, acetone, 10 parts; (2) or gasoline, 60 parts, acetone, 40 parts; (3) or acetone, 100 parts; (4) or gasoline, 60 parts, ethyl alcohol, 30 parts, methyl alcohol, 10 parts. The first admixture is generally preferred. To these admixtures, there is added at least for the first step of the treatment, a quantity of relatively weak sulfuric acid, such as about 50° Beaumé, for example, 2 volumes of 50° Beaumé acid to 100 parts by volume of any one of the above admixtures.

The process of the present invention will be more readily understood from a description of a specific example of a process embodying the invention and for this purpose, reference is made to the accompanying drawings which illustrate diagrammatically an apparatus in which the process may be carried out.

In the drawings, 3 represents a tank provided at its top with a man hole 2 into which a conveyor 1 is positioned to empty, said conveyor leading from a source of spent agent (not shown). To the bottom of the tank 3 is connected a pipe 50, provided with suitable valves 32 and 33 which lead to the outlet end of a pump 9. To the inlet end of the pump 9 is connected to a pipe 6, controlled by valves 5 and 7, terminating in tank 3 in the swing pipe 4. Thus, tank 3 is provided with a circulating system by means of which its contents may be circulated to and from the tank for the purpose of agitation.

Leading from the inlet of pump 9 is a pipe 31 which is controlled by valves 28 and 29 and communicates with a solvent acid solution tank 30 and a solvent mixture tank 27 at the bottom of said tanks. Said tanks are provided with inlet pipes 51 and 54 controlled by valves 53 and 52, which lead to a source of said solvent acid solution and solvent solution mixture (not shown).

The bottom of tank 3 is connected by pipe 55 and controlled by valve 34 which is connected to the inlet end of pump 35 and the outlet end of the pump is connected to a filter 36. The filter 36 may be of any well known type, either operated under vacuum or pressure and is provided with a pipe 37 controlled by a valve 38 which pipe is arranged to conduct filtered liquid to a used solvent tank 12. Pipe 11, controlled by valve 10, connects the outlet end of pump 9 to the top of said tank 12. Tank 12 is provided with a pipe 56 which is connected to the inlet end of pump 14 controlled by a valve 13, the discharge end of the pump connecting through pipe 15, controlled by a valve 16 with a still 17.

The still 17 may be of any preferred construction, which should preferably be provided with a draw-off pipe 18, including a pump 21 and valves 19 and 22 on opposite sides of the pump. Vapor pipe 23 leads from the top of the still 17 to a condenser 24 which discharges through a pipe controlled by a valve 26 into the top of a solvent mixture tank 27. The still 40 with a mechanical stirrer 47, is positioned under the filter 36, with conveyor 39, by means of which the pressed agent may be introduced into the still 40 through a man hole. A suitable steam jacket is provided around the still 40.

Vapor pipe 25 leads from still 40 to condenser 24 which discharges into the solvent mixture tank 27, controlled by valve 26. A man hole is provided at the bottom of still 40 and a conveyor 42 to carry away the finished agent. Pipe 54 controlled by valve 52, leads from the top of the solvent mixture tank 27 to a source of solvent solution (not shown). Pipe 51 controlled by valve 53 leads from the top of the acid solution tank 30 to a source of acid mixture (not shown).

In operating the process, the solvent mixture containing sulfuric acid in solution contained in tank 30 is introduced into treating tank 3 through pipe 31 through operation of pump 9.

Any of the previous examples of a suitable solvent mixture may be employed. The solvent containing both gasoline and either an alcohol or acetone constitutes both an oil and color solvent. No sulfuric acid should be added to the admixture contained in tank 27 but to the admixture in tank 30 is added from 1 to 5 volumes of 50° Beaumé sulfuric acid or other quantity of sulfuric acid, it being understood that the strength of the acid added may be varied somewhat without destroying the advantages to be derived from the invention and these advantages will be dependent somewhat upon the strength of alcohol, acetone or other color solvent employed.

As soon as a sufficient quantity of acid solvent mixture has been introduced into the treating tank 3, valves 8 and 29 are closed and valves 7 and 5 are opened, which permits the acid solvent mixture to circulate under the action of pump 9 back and forth into the tank 3, thus producing an agitation therein. The desired quantity of spent clarifying and decolorizing agent is then introduced into tank 3 by operation of the conveyor 1. The relative proportions of acid solvent mixture and clarifying and decolorizing agent may be widely varied. However, in practice, it is found convenient to employ approximately 6 pounds of agent for every gallon of solvent mixture during a single washing operation.

The agitation of the acid solvent mixture is maintained during the introduction of the spent clarifying and decolorizing agent and continued thereafter until the solvent effect of said solvent is completed, after which pump 9 is stopped and the mixture is allowed to stand until the washed decolorizing and clarifying agent has settled to the bottom of the treating tank 3. The swing pipe 4 is then adjusted so that most of the used acid solvent mixture may be decanted therefrom and discharged into used solvent tank 12.

In a similar manner, the said agent may be repeatedly washed with acid solvent mixture and finally given one or two washes with a solvent mixture from tank 27 which is free from acid. Thereafter, the washed agent is conducted to filter 36 wherein most of the used solvent mixture is separated from the washed agent by a filter pressing operation. The washed and pressed agent still containing a small percentage of solvent mixture passes from filter press 36 into evaporator 40, which is heated by steam around the jacket. The evaporator is provided with a mechanical mixer 41 which is driven during the evaporating process in order to agitate the spent agent therein and the vapors from the evaporator or still pass through a pipe 25 into condenser 24 in which said vapors are condensed to a liquid and therefrom delivered into the solvent mixture tank 27. The solvent mixture may thus be repeatedly reused in the process. As soon as the washed and treated agent is free of the solvent mixture, it is conducted to a storage by a conveyor 42 and can be used to again clarify and decolorize petroleum or other mineral oil. The used solvent mixture contained in tank 12 is recovered for reuse by a distillation operation.

After the distillation operation of the used solvent mixture, there remains in the bottom of still 17 the petroleum oil which was regained from the agent in the clarifying and decolorizing operation, the coloring matter of which was extracted, and the sulfuric acid employed in the solvent acid mixture. This mixture of oil, coloring matter and acid is delivered to a storage (not shown) after which it may be separated by well known methods.

An important feature of the present invention is the utilization of an acid solvent mixture containing a relatively small amount of sulfuric acid. The sulfuric acid employed should not be generally over 5 per cent by volume of the acid solvent solution and the best results have been obtained by employing sulfuric acid in the proportion of 2 per cent by volume of the solvent employed.

As a specific example of the results accomplished by the present invention, it is found that by employing two washes of an acid solvent composed of 10 per cent acetone by volume, 30 per cent ethyl alcohol by volume, 60 per cent gasoline by volume, to which is added 2 per cent by volume of sulfuric acid and then following such washing treatment by two washes with the solvent in which the sulfuric acid is omitted, the decolorizing agent is revivified so that it possesses an efficiency of from 105 to 115 per cent of the efficiency of the material before its original use.

The used solvent mixture contained in tank 12 contains a small percentage of sulfuric acid, which may be neutralized by the addition of the necessary quantity of pulverized sodium carbonate or other neutralizing agent before the distillation operation for the recovery of the solvent mixture and by this method, there will be avoided the necessity of employing a lead lining in still 17.

While a particular method of revivifying spent clarifying and decolorizing agents has been described, it is understood that various modifications may be made without departing from the principles or spirit of the present invention, and this invention includes all such modifications and changes as come within the scope of the appended claims.

I claim:

1. The process of treating spent clarifying and decolorizing agents which have been employed in the treatment of mineral oil and contain as their basic ingredient, hydrous aluminum silicate in a ratio of less than 1 part of alumina $Al_2O_3$ to 4 parts of silica $SiO_4$, which comprises washing the spent silicate with a color solvent containing less than 3% sulfuric acid, and thereafter washing said silicate with a color solvent free from sulfuric acid.

2. A process of treating spent clarifying and decolorizing agent which has been employed for the treatment of mineral oils and has been prepared by the acid treatment of a clay of the Montmorillonite type, which process comprises contacting the spent agent with a color solvent containing sulfuric acid, and thereafter washing said agent with a color solvent free from sulfuric acid.

3. A process of treating spent clarifying and decolorizing agents which have been employed in the treatment of mineral oils and which have been derived from the sulfuric acid treatment of Montmorillonite clay, which process comprises washing said spent agent with a combined color and oil solvent containing less than 3 per cent by weight of sulfuric acid, followed by one or more washes with a solvent free from sulfuric acid.

4. A process of activating a spent decolorizing agent which has been employed on mineral oils and prepared by acid treatment of a clay of the Montmorillonite type comprising, washing the clay with a mixture containing an oil solvent, a color solvent and a water solution of sulfuric acid, and thereafter washing the clay with a solvent free from sulfuric acid.

Signed at Washington, D. C., this 24th day of March 1926.

MARVIN L. CHAPPELL.